United States Patent [19]
Menzel

[11] Patent Number: 5,468,322
[45] Date of Patent: Nov. 21, 1995

[54] LOOP MACHIEN FOR HELICALLY WINDING STRIP

[75] Inventor: Stanley W. O. Menzel, Dry Creek, Australia

[73] Assignee: Rib Loc Australia Pty Ltd, Dry Creek, Australia

[21] Appl. No.: 211,287

[22] PCT Filed: Sep. 30, 1992

[86] PCT No.: PCT/AU92/00523

§ 371 Date: Mar. 29, 1994

§ 102(e) Date: Mar. 29, 1994

[87] PCT Pub. No.: WO93/06986

PCT Pub. Date: Apr. 15, 1993

[30] Foreign Application Priority Data

Oct. 2, 1991 [AU] Australia ................. PK8686

[51] Int. Cl.$^6$ ............................................. B29C 53/00
[52] U.S. Cl. ........................... 156/195; 156/425; 156/428; 242/7.22; 264/281
[58] Field of Search ........................ 156/195, 184, 156/189, 187, 191, 425, 428, 430, 431; 138/154, 122, 129; 242/7.21, 7.22; 72/49, 50; 264/281; 425/122, DIG. 7

[56] References Cited

U.S. PATENT DOCUMENTS

| | | | |
|---|---|---|---|
| 4,977,931 | 12/1990 | Menzel | 138/154 |
| 4,995,929 | 2/1991 | Menzel | 156/187 |
| 5,108,283 | 4/1992 | Show et al. | 242/7.21 X |

FOREIGN PATENT DOCUMENTS

| | | |
|---|---|---|
| 0377227A3 | 12/1989 | European Pat. Off. . |
| 63-56433 | 3/1988 | Japan . |
| PCT/AU92/00523 | 1/1993 | WIPO . |

*Primary Examiner*—James Engel
*Attorney, Agent, or Firm*—Klauber & Jackson

[57] ABSTRACT

The invention relates to apparatus for helically winding pipes from tube forming plastics strip comprising a single fixed rigid loop formed from a length of metal band, wherein the inner surface of the loop forms a spiral path along which the strip is directed when helically wound, strip guide means for guiding the strip into the path of the loop, and driven roller means for driving the strip around the spiral path and for joining together adjacent edges of adjacent convolutions of the strip, whereby during the helical winding process, the strip is driven around the spiral path in frictional engagement with the loop inner surface, maintaining intimate contact therewith, to thereby form the pipe.

11 Claims, 5 Drawing Sheets

LOOP MACHIEN FOR HELICALLY WINDING STRIP

This invention relates to apparatus for winding strip and in particular it relates to the winding of strip into tubular objects where the convolutions of the helix are joined to form a tubular object of indefinite length.

In machines already in use for this purpose it is customary to wind a plastics strip onto a rotating mandrel or to provide an annulus of rollers in the form of a roller cage assembly, which curves the strip into helical form when driven into the annulus by drive means, together with roller means for joining together the adjacent edges of the convolutions of the wound strip so as to form joining means which extends along a helical path. The joining means may comprise male and female locking formations integrally formed along opposite edges of the strip or a separate joining strip may be used as is known in the art.

Prior art pipe winding machines are generally of complex construction, are costly to manufacture and are of cumbersome size which makes transportation and on-site installation of the machine difficult. For example, in the relining of sewer pipes, the machine must be lowered down through man-hole openings which can be quite small and subsequently installed in a confined space at the base of the man-hole where accessibility is limited.

Another disadvantage of prior art pipe winding machines which employ an annulus of rollers, is that the winding process may sometimes be stopped because of the winding strain so induced during the winding process. In the event that the winding process is stopped, the outer periphery of the wound tube flows into the space between the rollers thus creating a "wavy" nature on the outer wall of the pipe. This also creates a problem when start-up is commenced due to a "brake" effect caused by the undulations.

The present invention seeks to address at least some of these problems.

The object of the present invention is to provide a machine of this general type, the construction of which is extremely simple, inexpensive, compact and allows the machine to be readily transported and handled for on-site operations.

Another object of this invention is to provide a pipe winding machine which is capable of handling tube forming plastics strip of varying widths to produce tubes or pipes of the same diameter.

Broadly according to this invention therefore, apparatus for helically winding tubes or pipes from tube forming plastics strip comprises: a winding head formed by a fixed rigid approximately ring-shaped metal band, the inner surface of said band forming a spiral path along which the strip is directed when the apparatus is in use, said head having a free leading edge which extends axially thereof and which constitutes the leading end of the spiral path; strip guide means to guide the strip to feed into the leading end of said spiral path; roller means extending axially of the head and adjacent said leading edge for driving the strip around said spiral path, and for joining together adjacent edges of the strip when thus driven; power means for driving said roller means, whereby during operation of the apparatus, the tube forming strip is driven around said path in frictional engagement with said metal band inner surface, maintaining intimate contact therewith, to thereby form a cylindrical helix the convolutions of which are joined along adjacent edges.

Preferably, engagement means is provided on the head for urging the strip convolutions in the direction of winding. This can be important when the strip is under severe load within the head, to ensure that the helix angle is maintained during winding.

Preferably, the roller means comprises a pair of vertically spaced parallel drive rollers, one above and one below the leading edge of the metal band, the rollers extending approximately axially of the head. Preferably, the upper one of said rollers comprises a joining roller arranged to join together the adjacent edges of the strip (being fed into the machine) and the last formed convolution.

In some embodiments of the invention, the strip guide means is designed to ensure correct angular feed of the strip to the winding head.

Preferably, the winding head consists of a single helically disposed loop with the leading axial edge of the loop coinciding approximately with the point where the first convolution meets the incoming strip as once the convolution is joined to the strip the helical formation continues under guidance of the helically disposed loop.

Preferably, a circumferential gap exists between the leading and trailing edges of the helically disposed loop to facilitate location of the pair of drive rollers, the rollers being approximately vertically aligned with said gap. Preferably, at least the lower drive roller extends across the full width of the loop to assist the drive of the helically wound strip out of the winding head.

Preferably, additional roller drive means are provided upstream of said guide means to provide additional drive for the strip, it being appreciated that the strip drive needs to be quite powerful due to the friction generated between the strip and the loop and the consequential back-pressure which is created.

Preferably, a series of idler rollers or wheels are rotatably supported at circumferentially spaced apart positions around the helically disposed loop, said rollers projecting through openings in the wall of the loop, and being arranged to facilitate movement of the strip along its helical path and to alleviate extreme frictional forces between the loop and strip during winding. Where the strip is ribbed, the rollers may locate between pairs of ribs and engage the base of the strip, and thereby assist in maintaining the helix angle.

In another embodiment of the invention the winding head is formed from a length of metal band and comprises a generally cylindrical loop which has an axial width which approximates to twice the width of the strip being wound, the loop having a first peripheral edge on the strip entry side of the winding head and a second peripheral edge, spaced axially from the first edge, on the strip exit side of the winding head, the edges lying in respective plane which are parallel to one another, a circumferentially extending strip feed-in opening extending axially inwards from said first edge and dimensioned so as to permit the strip to be fed therethrough and travel along said spiral path.

Preferably, one of the axially extending edges of the feed-in opening, extends across the whole axial width of the loop, and forms the leading edge of the loop, the loop having a trailing axial edge which is spaced circumferentially from the leading edge to thereby form an axially extending gap of sufficient size to allow the drive and joining rollers to locate therealong and engage the strip as it travels around its spiral path.

Preferably, the cylindrical loop is provided with a plurality of idler rollers mounted in its wall and which extend axially thereof, each roller projecting through an opening in the wall of the loop to engage the strip as it travels around the loop, the rollers being angled to ensure that the strip is positioned correctly along its helical path.

In lieu of the idler rollers, the strip guide means may be orientated so that the strip guide is fed in at an angle to the axis of the tube being formed, to achieve the required helical formation.

Preferably, the strip guide means comprises an elongate horizontal tray or platform, said winding head being detachably mounted to said tray or platform.

Preferably, the loop is strengthened by means of a C-shaped radial flange which extends circumferentially around the loop, the ends of the flange connecting with a U-shaped tray which extends axially beneath the gap in the loop and forms a support means for the bottom drive roller.

With this invention an extremely compact, simple winding machine can be constructed, which is able to wind a spiral pipe with an extremely accurate external diameter (due to the intimate, continuous contact between the strip outer surface(s) and the loop inner wall).

Of course, different size loops will be needed to produce pipes of varying diameters, however, the simplicity of design of the loop in comparison to known roller cages or those machines which employ a rotating mandrel, more than compensates for the inability of the loop to be adjusted to produce pipes having substantially different diameters. It will be realized that the loop of this invention may incorporate an adjustment device to vary the width of the gap between the leading and trailing edges of the loop to in turn adjust the diameter of the loop, to thereby enable pipes of similar diameter to be produced from the same loop.

For large size loops, the loop can be split into two (or more) sections and removed from the other machine elements and subsequently re-assembled when transported to its on-site location. This allows the loop to be easily passed through small man-hole openings and then easily re-assembled when in the man-hole chamber.

The machine is also devised to wind double-walled strip having internal spacing ribs.

To enable the invention to be more fully appreciated, some embodiments will be described hereinafter with reference to the accompanying illustrations in which.

It is to be clear however that these illustrations are included merely to demonstrate the general principle of the invention and are not to be taken as limiting the invention to the form shown.

Figure 1:
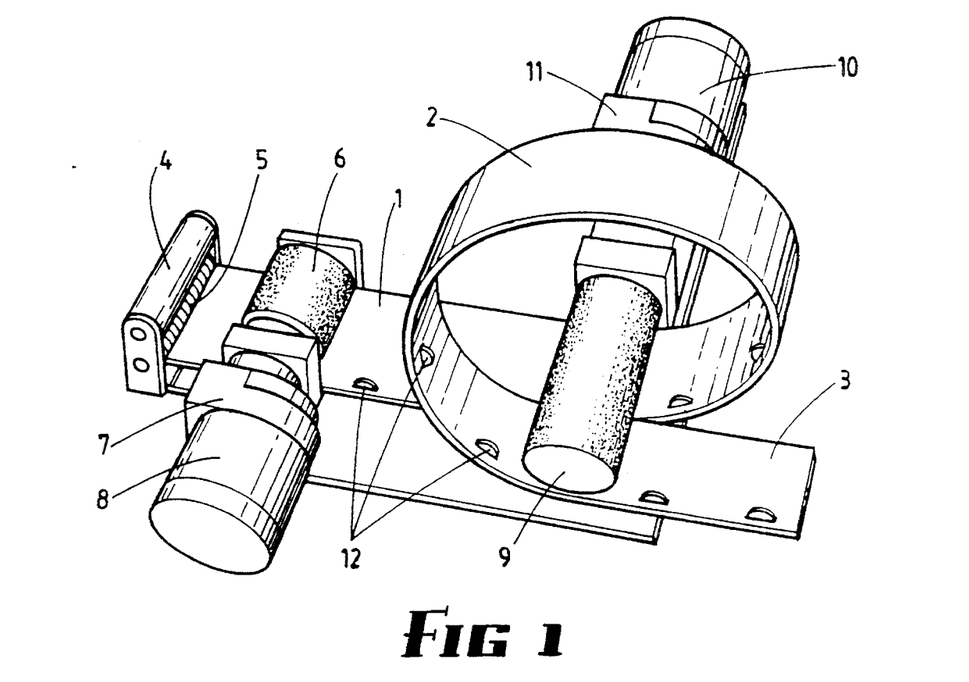
FIG. 1 is a perspective view of a typical form of the invention.

As will be seen from FIG. 1, a strip guide 1 extends to a winding head which comprises a rigid helically disposed loop 2 which is preferably formed from elongate metal plate having a wall thickness in the order of 6mm. In this embodiment, the loop 2 is provided with a tail 3.

At the end of the strip guide 1, distant from the helically disposed loop 2, are guide rollers 4 and 5, the guide roller 4 being plain but the guide roller 5 being provided with circumferential flanges to fit between the ribs of a strip when the strip takes the form of a membrane having upstanding ribs on one side thereof.

Adjacent to the guide rollers 4, 5 is a feed roller 6 which is driven through a gearbox 7 from a motor 8 and this roller 6 is adapted to engage the membrane of the strip and urge it along the strip guide 1 to the helically disposed loop 2 but this can be replaced or aided by drive to the guide rollers 4 and 5 at the commencement of the strip guide which can be driven to supply the necessary driving force to the strip to urge it to the helically disposed loop 2.

At the commencement of the helically disposed loop 2 is a drive/joining roller 9 which provides further drive to the strip to urge it into the spiral path formed by the inner surface of the loop 2, and which presses the edge of the first convolution of the strip into engagement with the edge of the flat strip reaching the joining roller 9 to either interengage tongue and groove means at the two opposite edges of the strip to lock the two overlapping edges together or to apply a separate joining member (not shown) to the two edges either overlapping or abutting or the joining member can fit between the edges of the first convolution and the strip. If a separate joining member is used, this is fed into the winding head along with the plastics strip.

The joining roller 9 is driven by a motor 10 through a gearbox 11.

Figure 2:
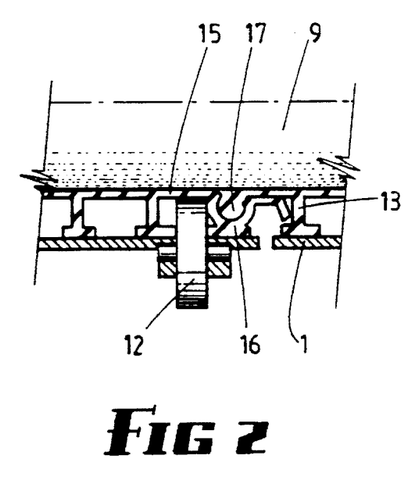
FIG. 2 is an enlarged view showing in transverse section a portion of the strip support and guide member, showing also a portion of the strip.

To assist movement of the strip along the strip guide 1 and around the helically disposed loop 2 and to alleviate, where necessary, the effect of friction during winding, roller members 12 can be disposed on the guide 1 and loop 2, which can consist of freely rotatable narrow rollers or wheels 12 projecting through openings in the wall of the guide 1 or loop 2 to engage between the ribs 13 of the strip which ribs are upstanding from the membrane 15 as shown in FIG. 2. The strip has a longitudinal socket 16 extending along one edge thereof which is engaged by a longitudinal bead 17 at the other edge of the strip. The rollers 12 on the loop 2 will normally be arranged to rollingly engage the outer surfaces of the flanges formed at the free ends of the ribs 13.

In FIG. 1 these guide members 12 are shown along one edge of the strip guide 1 and it will be realized that by appropriately adjusting the effective width of the strip guide 1 and the helically disposed loop 2 the two edges of the strip can be caused to overlap as again shown in FIG. 2.

Figure 3:
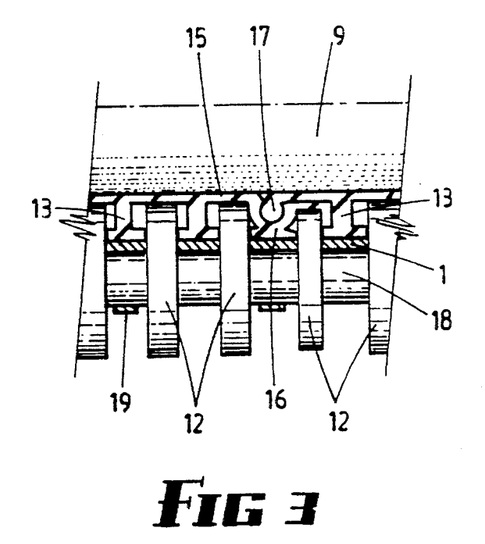
FIG. 3 is a similar view to FIG. 2 but showing multiple guide members.

It is however possible to have the guide members 12 arranged on shafts 18 to project through slits 19 in the strip guide 1, which slits 19 are disposed transversely across the strip guide, and in this case as shown in FIG. 3, the guide members 12 can support the strip by engaging the underside of the membrane 15 between the ribs 3 to provide anti-friction means for the strip guide to facilitate movement of the strip on the strip guide 1 and in such a case the shaft 18 which supports the guide members 12 can be disposed beneath the feed roller 6 and the joining roller 9 to provide pressure means to support the strip through the membrane 15 of the strip to allow the feed roller 6 and the roller 9 to give effective drive to thereby ensure that the strip maintains intimate contact with the inner surface of the loop 2.

The strip support can have a series of guide members carried on edge members which can be held to form the strip guide 1 and the helically disposed loop 2 but this form can also be used with rollers which simply extend at close intervals across the strip guide 1 including the helically disposed loop 2.

In this embodiment, small adjustments in the diameter of the loop 2, and in turn the diameter of the tube being wound, can be achieved by adjusting the position of the tail 3, the loop having at least some degree of resilience.

Figure 4:
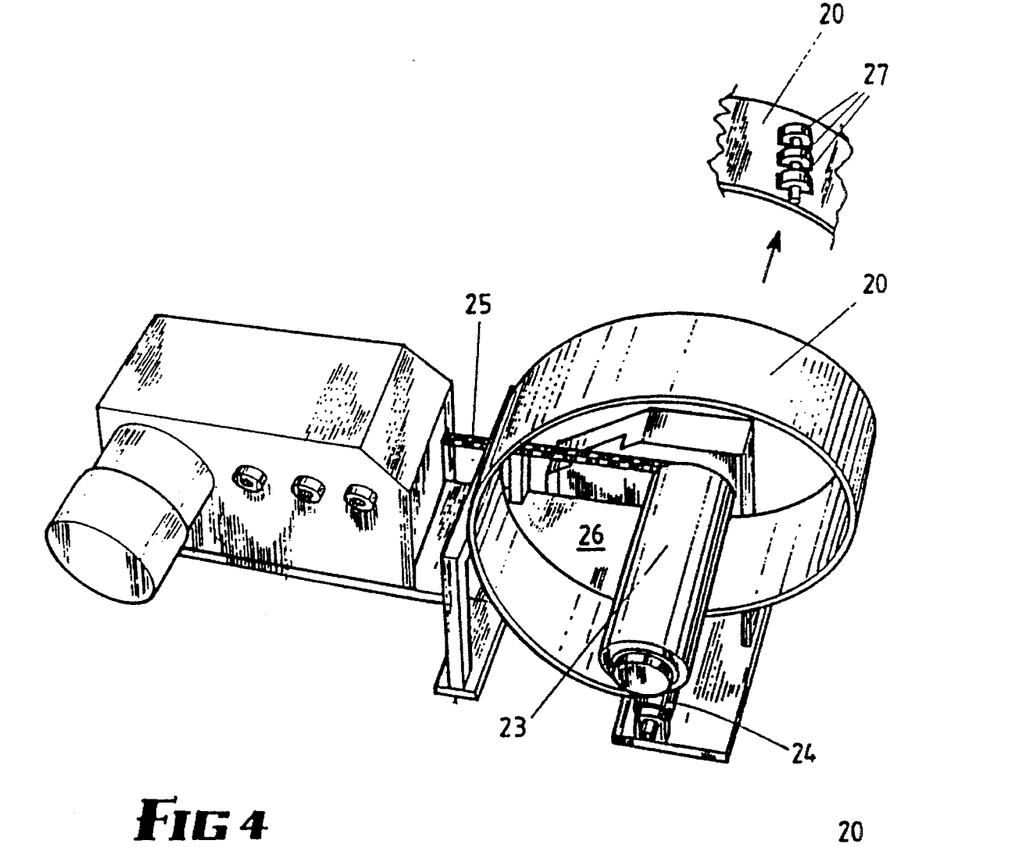
FIG. 4 is a perspective view which shows an alternative form of this invention (in schematic form) where a pair of elongate rollers is mounted in the gap formed between the leading and trailing edges of a helically disposed loop, and function to drive the strip into the loop and join together the adjacent edges of the strip.
Figure 5:
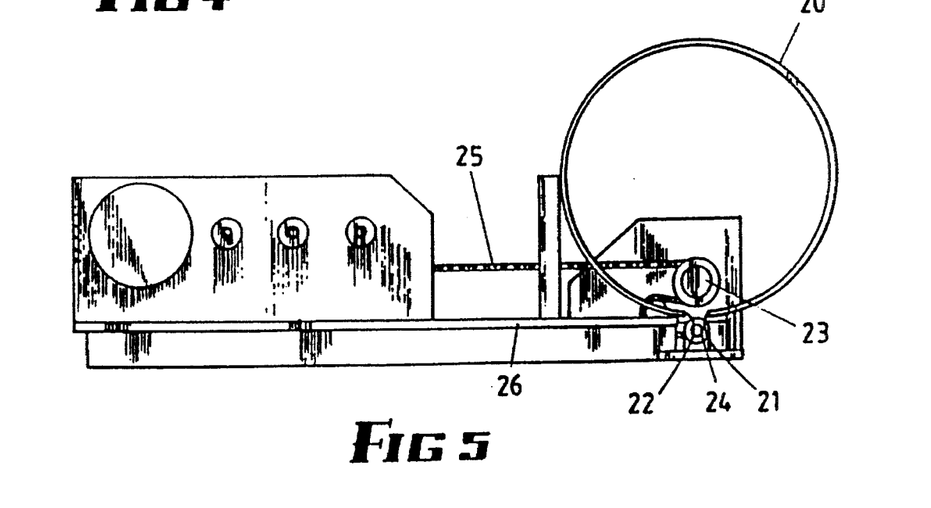
FIG. 5 is a fragmentary end elevational view of the machine shown in FIG. 4.

With reference to the embodiment shown in FIGS. 4 and 5 of the drawings, the winding head of the machine comprises a loop 20 which has its leading and trailing edges 21, 22 respectively, axially offset and spaced apart circumferentially so as to form an axial gap through which a pair of rollers 23, 24 extend, both rollers being driven by a drive motor (not shown) via an endless drive chain 25.

The rollers 23, 24 make pressure contact with the strip and drive the strip into the spiral path formed by the loop 20 with the strip outer surface(s) in frictional engagement with the loop inner surface. The roller 23, also constitutes a joining roller arranged to interengage the marginal edge of the first convolution of the helix and the adjacent edge of the incoming strip passing between the rollers 23, 24.

In this embodiment, the strip guide 26 is in the form of a tray solidly mounted with respect to the loop 20 and terminates just short of the nip of the rollers 23, 24.

As with the machine shown in FIG. 1, a drive roller assembly (not shown) is mounted at the leading end of the guide 26 in order to feed the strip to the drive rollers 23, 24.

Freely rotatable wheels or rollers 27 (shown in FIG. 1) may be mounted at spaced positions around the loop 20 so as to project into the spiral path of the strip in order to assist strip movement through the loop and to alleviate extreme friction, e.g. when winding PVC strip to form small diameter pipe.

In a variation to the above described embodiments, the loop may be perforated as a means of allowing some of the friction generated heat to dissipate. The inner surface of the loop may be coated with a low friction coating material, or even chrome plated. In instances where very high friction is created, e.g. where a stiff profile is wound into "tight" tube, it may be advantageous to apply, either continuously or at intervals, a silicone or teflon grease to the loop inner surface.

It has been found in practice that profile strips of polyethylene can be wound quite readily without the need for idler rollers on the loop, however, with PVC plastic strips, considerable friction is created, and it is advantageous to employ rollers around the circumference of the loop.

Figure 6:
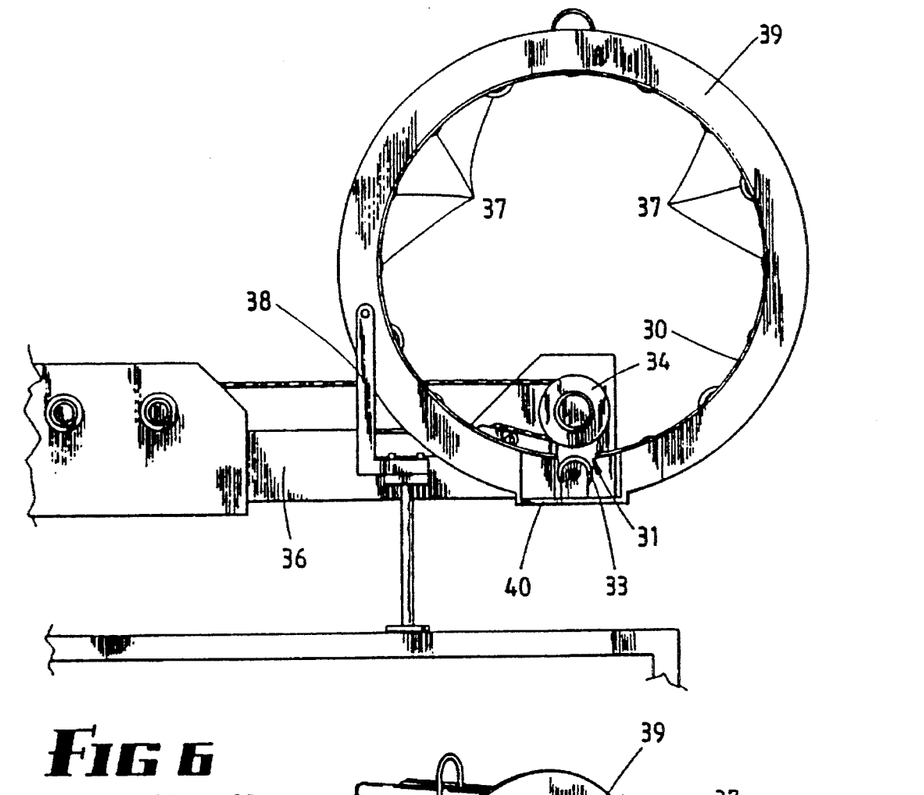
FIG. 6 is a fragmentary end elevational view of a machine according to a still further embodiment of the invention.
Figure 7:
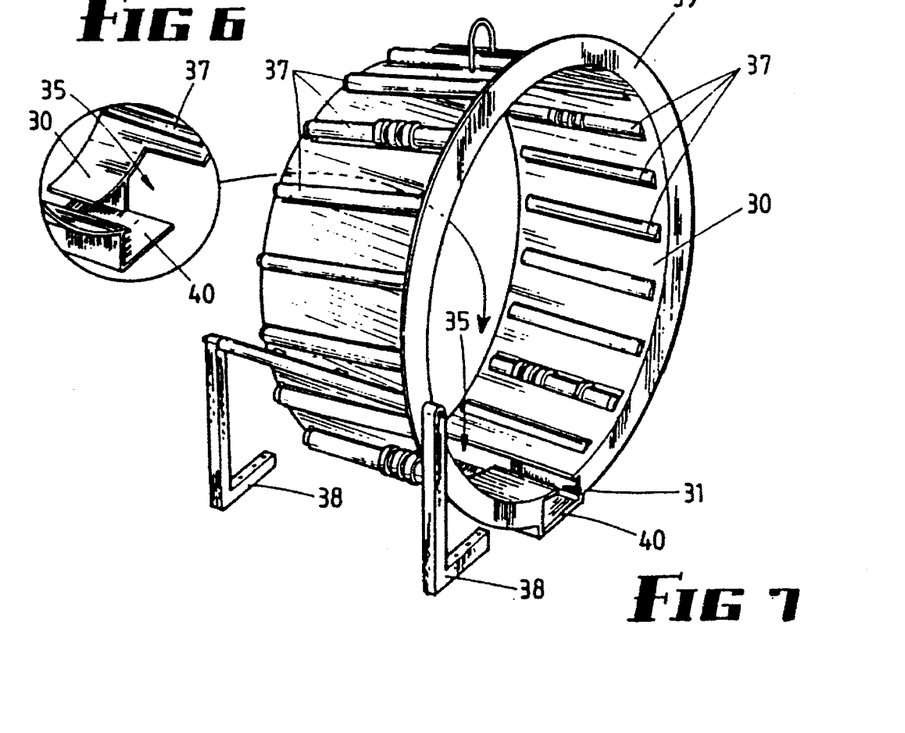
FIG. 7 is a perspective view of the winding head shown in FIG. 6.

In the embodiment illustrated in FIGS. 6 and 7 of the drawings, the winding head comprises a split cylindrical loop 30 roll-formed from a length of metal band, the ends of the loop 30 being spaced apart so as to form a circumferential gap 31 which extends axially across the whole width of the loop 30. A pair of vertically spaced, horizontally extending rollers 33, 34 are mounted axially of the loop 30, the axis of roller 33 being above the gap 31, whilst the axis of roller 34 is beneath the gap 31. Roller 33 is a drive roller for driving the strip into and around the loop 30, whilst roller 34 is a drive/joining roller for joining together adjacent edges of the strip as it is being helically wound (this being well-known in the art).

The loop 30 is provided with a strip feed-in opening 35 on its strip entry side to allow the strip travelling along a horizontal strip feed-in guide 36, to be fed flat into the winding head. The opening 35 is sufficiently large so as to permit the free end of the guide 36 to be located just short of and approximately horizontally aligned with the hip the rollers 33, 34.

Attachment members 38 are provided on the loop 30, one on each side thereof, to detachably connect the loop 30 to the guide 36 which, in this embodiment comprises an elongate horizontal drive tray.

A series of elongate idler rollers 37 are mounted on the loop 30 and project through rectangular apertures in the wall of the loop 30, so that, during the winding operation, the rollers 37 will engage strip being wound and assist its movement around the loop 30. The rollers 37, in accord with known art, are suitably angled to ensure that the strip is made to follow an helical path around the inner surface of the sleeve 30.

The loop 30 can be stiffened by means of a circumferentially extending radial flange 39, the ends of the flange 39 being secured to a horizontal channel-shaped base 40 which extends beneath the gap 31 in the loop 30 and forms a support for supporting the bearing support(s) of the lower drive roller 33.

Figure 8:
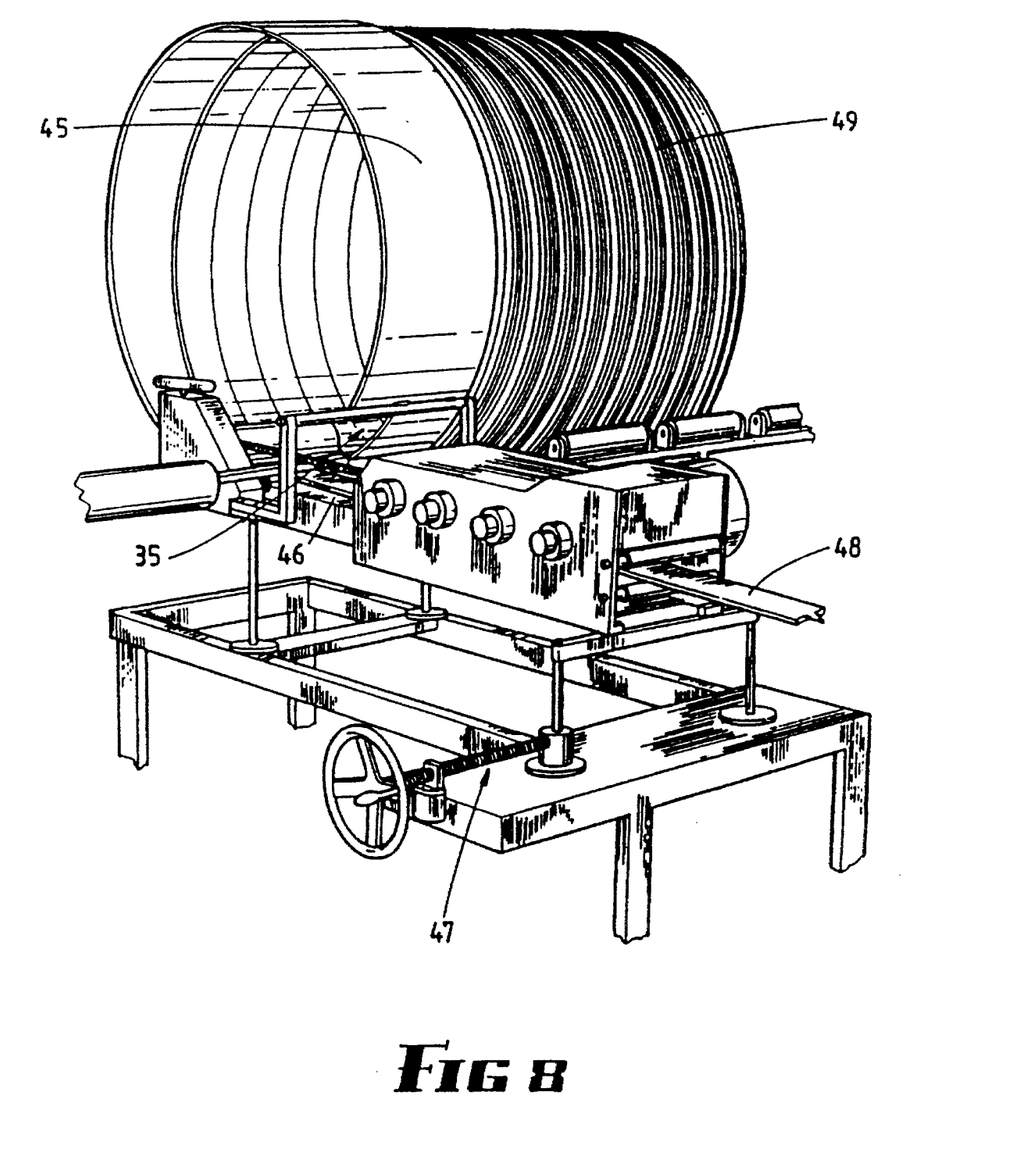
FIG. 8 is a perspective view of a winding head and drive tray assembly according to yet a still further embodiment of the invention, whilst
Figure 9:
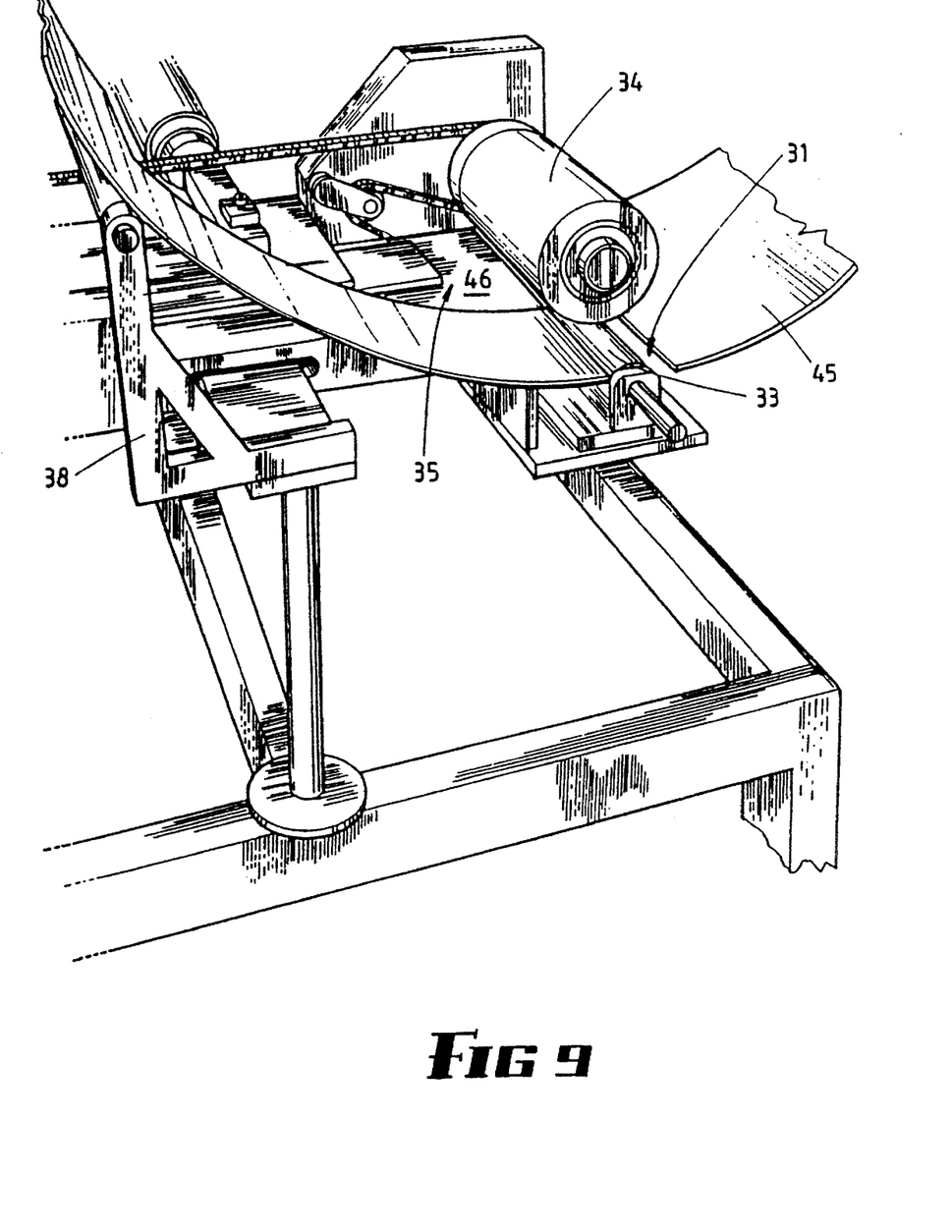
FIG. 9 is a fragmentary perspective view of the winding head shown in FIG. 8.

In the embodiment shown in FIGS. 8 and 9 of the drawings (where equivalent parts have been given the same item numbers to those in FIGS. 6 and 7), the loop 45 is similar to that shown in FIG. 6 and 7, except there are no idler rollers around the loop 45. The strip feed-in guide 46 is horizontally adjustable relative to the loop 45 by adjustment means 47 so that it can be orientated in such a manner that the strip 48 is fed in at an angle to the axis of the tube 49 being formed, to achieve the required helical path of travel around the inner surface of the loop 45. This avoids the need to utilize angled rollers 37. The width of the gap 31 can be made to be adjustable to in turn allow the diameter of the loop 45 to be varied by a small amount, and in turn to permit pipes of slightly different diameter to be wound.

It should be appreciated that there must always be some measure of friction involved in order to successfully wind the strip, and that friction heat generated during the winding process allows the pipe to be stress-relieved. Furthermore, the friction heat may soften the strip material and ensure better forming and subsequent holding of the required shape.

While the form of strip is shown in the nature of a ribbed strip, it will be realized that a compound strip could be similarly wound in which for instance two ribbed strips are placed back to back to have planar outer and inner wall in the completed tube with the ribs interengaging to provide a structure of the required rigidity.

The interengaging means would preferably be so arranged that the two strips could slide one on the other during formation of the tube but could then be locked together by application of a quick setting adhesive or by the shape of the strip itself to ensure that once the tube is formed it is of a stable diameter as it issues from the winding machine.

This form of machine can also be used in what we term an "Expanda tube", that is, a tube which as it is wound is pressed together at the junctions to form a rigid fixed diameter until such time as release means become operative to allow the tube to expand by allowing slip between the edge joining members of the tube so formed such a tube being generally defined in our earlier patent application No PCT/AU87/00069.

Thus the profile formed by the strip could be smooth walled on both the inner and outer sides or could have a multi-walled construction and could be with or without steel reinforcement.

The claims defining the invention are as follows:

1. An apparatus for helically winding tubes or pipes from tube forming plastic strip comprising:

a ring-shaped, rigid winding head formed from a length of metal band, having a free leading edge and a free trailing edge, each of said edges extending axially of the head, the inner surface of said head forming a spiral path extending between said leading and trailing edges and along which the strip is directed when the apparatus is in use, said free leading edge being spaced from said free trailing edge so as to form a circumferential gap which extends axially across the width of said head;

strip guide means to guide the strip to feed horizontally into the leading end of said path;

roller means arranged to drive the strip into and around said spiral path and for joining together adjacent edges of the strip when thus driven, said roller means comprising a pair of driven vertically spaced parallel elongate rollers extending axially of the head and respectively positioned above and below said circumferential gap and being coextensive therewith;

power means for driving said pair of rollers of said roller means;

arranged and constructed so that during operation of the apparatus, the tube forming strip is driven around said path in frictional engagement with said inner surface of the head to thereby form a cylindrical helix, the convolutions of which are joined along adjacent edges.

2. Apparatus according to claim 1 wherein said winding head comprises a single helically disposed loop.

3. Apparatus according to claim 2 further comprising a series of idler rollers rotatably supported at circumferentially spaced apart positions around the helically disposed loop, said idler rollers projecting through openings in the wall of the loop and being arranged to facilitate movement of the strip along its helical path and to alleviate extreme frictional forces between the loop and the strip during winding.

4. Apparatus according to claims 1 further comprising additional roller drive means, upstream of said guide means to provide additional drive for the strip being fed into the winding head.

5. Apparatus according to claim 1 wherein the winding head comprises a generally cylindrical loop having a first peripheral edge on the strip entry side of the winding head and a second peripheral edge, spaced axially from the first edge, on the strip exit side of the winding head, the peripheral edges lying in respective planes which are parallel to one another, a circumferentially extending strip feed-in opening extending axially inwards from said first edge and dimensioned so as to permit the strip to be fed horizontally into said winding head.

6. The apparatus according to claim 5 wherein said strip feed-in opening is defined, in part, by an axially extending edge which extends across the whole axial width of the loop, and which forms said free leading edge of the loop.

7. Apparatus according to claim 6 wherein the axial width of said loop is approximately twice the width of the strip being wound.

8. Apparatus according to claim 7 further comprising a plurality of idler rollers mounted in the wall of the cylindrical loop and which extend axially thereof, each said idler roller projecting through an opening in the wall of the loop to engage the strip as it travels therearound, said rollers being angled to ensure that the strip is positioned correctly along its helical path.

9. Apparatus according to claim 5 further comprising a reinforcing flange extending circumferentially around the loop on the strip exit side of the winding head and fixedly secured thereto.

10. Apparatus according to claim 5 further comprising a support member extending axially of the loop beneath the gap and being fixed with respect to the loop, the support member providing support for the lower one of said rollers.

11. Apparatus according to claim 1 wherein the strip guide means comprises an elongate horizontal drive tray, said winding head being detachably mounted to said drive tray, near an end thereof.

* * * * *

UNITED STATES PATENT AND TRADEMARK OFFICE
CERTIFICATE OF CORRECTION

PATENT NO.  : 5,468,322
DATED       : NOVEMBER 21, 1995
INVENTOR(S) : STANLEY W.O. MENZEL

It is certified that error appears in the above-indentified patent and that said Letters Patent is hereby corrected as shown below:

On the Title page, item [54] and in col. 1;
  Please change "MACHIEN" to --MACHINE--.

Signed and Sealed this

Twentieth Day of February, 1996

Attest:

BRUCE LEHMAN

Attesting Officer

Commissioner of Patents and Trademarks